(12) United States Patent
Parekh et al.

(10) Patent No.: US 6,376,081 B1
(45) Date of Patent: Apr. 23, 2002

(54) SELF-CROSSLINKING RESIN AND COATING COMPOSITIONS MADE THEREFROM

(75) Inventors: Girish G. Parekh, Wexford, PA (US); Paul Bohler, Uetikon (CH); Jason M. Legleiter, Jefferson Hills; Donald Wind, Gibsonia, both of PA (US)

(73) Assignee: Valspar Corporation, Minneapolis, MN (US)

( * ) Notice: Subject to any disclaimer, the term of this patent is extended or adjusted under 35 U.S.C. 154(b) by 0 days.

(21) Appl. No.: 09/676,962

(22) Filed: Oct. 2, 2000

(51) Int. Cl.$^7$ ................................................ B32B 15/08
(52) U.S. Cl. ........................ 428/418; 523/414; 525/533
(58) Field of Search ........................ 523/414; 525/533; 428/418

(56) References Cited

U.S. PATENT DOCUMENTS

| | | | |
|---|---|---|---|
| 3,862,914 A | * | 1/1975 | Anderson .................... 513/414 |
| 4,105,614 A | | 8/1978 | Davis et al. |
| 4,226,755 A | | 10/1980 | Knecht |
| 4,413,015 A | | 11/1983 | Anderson et al. |

* cited by examiner

*Primary Examiner*—Philip Tucker
*Assistant Examiner*—D. Aylward
(74) *Attorney, Agent, or Firm*—Fish & Richardson P.C.

(57) ABSTRACT

The invention provides a resin composition that is the reaction product of an epoxy resin and an anhydride. The resin composition has an epoxy equivalent weight that is substantially the same as the epoxy equivalent weight of the epoxy resin. The resin composition may be used as a coating composition, or may be mixed with water to form a water based coating composition.

31 Claims, No Drawings

SELF-CROSSLINKING RESIN AND COATING COMPOSITIONS MADE THEREFROM

BACKGROUND

Metal containers are typically coated with a protective coating to prevent damage to the container surfaces or contamination of the material packaged inside. Conventional container coatings may be derived, for example, from a formulation that includes trimellitic anhydride, a diol crosslinker, and an epoxy resin. These epoxy formulations described are applied as dispersions in a volatile organic solvent and then baked to form a lacquer-like coating on a metal substrate. Unfortunately, however, these volatile organic compounds (VOCs) are released into the atmosphere during the baking process, and may remain in the coating and degrade a product stored in the container.

To reduce VOC emissions, a heat curable coating for metal food contact surfaces may be derived from a water dilutable dispersion containing an epoxy resin. An effective water based coating may be obtained by adducting sufficient bisphenol to a diglycidyl ether of a bisphenol to react with all epoxy groups. The resulting oxirane defunctionalized adducts are then made water-soluble by reaction with an anhydride. The resulting dispersions are made thermoset using a conventional aminoplast crosslinking agent, such as highly butylated urea formaldehyde. Unfortunately, however, condensation products and by-products of these crosslinking agents, such as methanol, butanol, and formaldehyde, are released into the atmosphere during the baking process.

SUMMARY

There is a need in the packaging coatings industry for improved coatings (e.g., packaging coatings) that protect the packaged goods from contamination and do not release harmful compounds into the atmosphere during the baking process. Changes in food processing and environmental regulations continue to prompt manufacturers to develop new coating formulations with superior safety and processing characteristics compared to existing formulations. The present invention provides such formulations. In particular, the present invention provides improved resin compositions that comprise the reaction product of an epoxy resin and an anhydride. In preferred embodiments the resin composition's epoxide equivalent weight (EEW) has not been significantly changed, compared to the unreacted epoxy resin, to an extent that would cause any undesirable gelling or crosslinking of the resin. The reaction may preferably be conducted in an aprotic solvent.

In certain embodiments, the resin and coating compositions of the present invention do not require additional crosslinkers to form a crosslinked network. In addition, the resin compositions of the invention may be emulsified in water to form water based coating compositions that have reduced VOC emissions during bake. The self-crosslinking coating compositions of the invention are stable in aqueous media, have stability and curing profiles that comport with production scale food and beverage packaging applications, adhere well to metal, and are resistant to leaching, corrosion, and other forms of degradation.

The details of one or more embodiments of the invention are set forth in the accompanying drawings and the description below. Other features, objects, and advantages of the invention will be apparent from the description and drawings, and from the claims.

DETAILED DESCRIPTION

In one embodiment, the invention includes a resin composition that is the reaction product of an epoxy resin and an anhydride, wherein the reaction product has oxirane groups available to participate in further crosslinking reactions. The resin composition's epoxide equivalent weight (EEW) preferably has not been significantly changed, compared to the unreacted epoxy resin, to an extent that would cause any undesirable crosslinking of the resin. This resin may be used as a coating, or may be formulated with other components to create a coating composition.

The epoxy resin includes a backbone with pendant oxirane and pendant hydroxyl functional groups. In general, the reaction of the epoxy resin and the anhydride takes place in an organic medium under conditions selected such that the oxirane groups remain substantially intact and the pendant hydroxyl groups react with the anhydride to form ester linking groups on the backbone. The ester linking groups have pendant carboxyl functional groups.

The epoxy resins may vary widely depending on the intended application. The epoxy resin includes a pendant oxirane group and a pendant hydroxyl functional group on a backbone. A representative epoxy resin is shown in Formula 1:

FORMULA 1

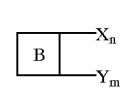

Where B represents the backbone, X is an oxirane group, Y is a hydroxyl functional group, and n and m are independently at least 1, preferably at least 2.

In one embodiment, the epoxy resin is a reaction product of an epoxide and a dihydroxy compound. The dihydroxy compound used to make the epoxy resin may vary widely depending on the intended backbone structure needed in the epoxy resin. Preferably, the dihydroxy compound is selected from bisphenol A, bisphenol F, biphenol, resorcinol and the like, and bisphenol A is particularly preferred. Commercially available epoxy resins that are suitable for the present invention include those available under the trade designations EPON 1001, 1004, 1007, 1009, and 2004 resins from the Shell Chemical Co., Houston Tex. Preferred epoxy resins have a number average molecular weight of about 1,000 to about 10,000 and an epoxy equivalent weight of about 500 to about 5,000. Most preferred epoxy resins have an average number molecular weight of about 1,000 to about 8,000 and an epoxy equivalent weight of about 500 to about 5,000.

The epoxy resin is reacted with an anhydride to form a resin composition. Suitable anhydrides may vary widely depending on the epoxy resin selected and the reaction conditions. Examples of useful anhydrides include succinic anhydride, methyl succinic anhydride, tricarballylic anhydride, phthalic anhydride, hexahydrophthalic anhydride, trimellitic anhydride, itaconic anhydride, and maleic anhydride. Dianhydrides, such as, for example, benzophenone tetracarboxylic dianhydride (BTDA) or pyromellitic dianhydride, may also be used, and may increase cure rate and form a more densely crosslinked reaction product. When dianhydrides are used care should be taken to ensure that no undesirable gellation of the resin occur.

To prepare the resin compositions of the invention, the epoxy resin and the anhydride are reacted in a liquid medium under reaction conditions such that the reaction between the anhydride and the hydroxyl functional groups is substantially preferred over the reaction between the anhydride and the oxirane groups. The progress of the reaction can be monitored through methods such as NMR, IR, gas chromatography, or other methods known in the art. The resulting reaction product has oxirane groups available for further crosslinking reactions, and the reaction product's epoxide equivalent weight (EEW) preferably has not been significantly changed, compared to the unreacted epoxy resin, to an extent that would cause any undesirable gelling or crosslinking of the resin. Preferably, the resulting reaction product's EEW is no more than 50% higher than that of the starting epoxy resin. More preferably, the resulting reaction product's EEW is no more than 30% higher than that of the starting epoxy resin. Most preferably, the resulting reaction product's EEW is no more than 15% higher than that of the starting epoxy resin.

The anhydrides react with the pendant hydroxyl groups on the epoxy resin to generate ester acids. This reaction is represented in formula 2 below:

FORMULA 2

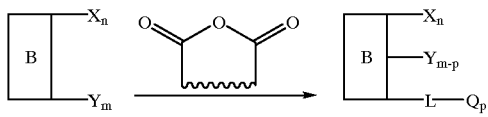

Where B is the resin backbone, X is an oxirane group, Y is a hydroxyl group, L is an ester linking group, Q is a reactive carboxyl functional group, m and n are as previously defined, p is at least 1, preferably 2, and the sum m-p is at least 0.

The liquid medium used to prepare the resin compositions of the invention is preferably selected from aprotic solvents such as ketones, ethers, aryl ethers, ether esters and alkyl ethers, aromatic hydrocarbons (e.g., toluene, xylene, etc.), used alone or as mixtures. Suitable solvents or solvent mixtures have between about 2 and about 8 carbon atoms. Suitable ketones or esters include aliphatic compounds containing between 3 and 8 carbon atoms, such as, for example acetone, diethyl ketone, methylethyl ketone, methylpropyl ketone, methylbutyl ketone, methylamyl ketone, methylhexyl ketone, ethylpropyl ketone, ethylbutyl ketone, ethylamnyl ketone, dioxane, tetrahydrofuran (THF), and methoxy acetone. Dialkyl ethers of alkylene glycols and polyethylene glycols, such as glyme, diglyme, and the like, may also be used. Suitable alkyl ethers of diethylene glycol may contain between 1 and 4 carbon atoms in the alkyl group. Preferred liquid media include 1-methoxy-2-propranol acetate and methyl ethyl ketone (MEK).

Reaction temperatures for synthesizing the resin compositions of the invention are typically less than about 120° C. The preferred temperature range is from about 40° C. to 120° C. More preferably, the temperature range is from about 60° C. and 100° C., and most preferably, from about 70° C. to 80° C. Typically reaction times are less than about 20 hours. Preferably, they are between about 4 and 16 hours, and most preferably, between about 5 and 15 hours.

A catalyst is preferably used to prepare the resin compositions of the present invention. While not wishing to be bound by any theory, the catalyst is believed to selectively enhance the formation of the ester linking groups between resin backbones via reaction of the hydroxyl group with the anhydride group, and limit the reaction between the carboxyl functional groups on the opened anhydride and the oxirane groups on the resin backbone. Preferably, the catalyst is a tertiary amine. Suitable catalysts include, but are not limited to methyl diethylamine, triethyl amine, dimethyl propyl amine, methyl dipropylamine, tripropyl amine, methyl diisopropyl amine, methyl dibutyl amine, ethyl dibutyl amine, tributyl amine, N,N diethyl benzyl amine, 1,4-diazabicyclo(2,2,2) octane (DABCO), 1,8-diazabicyclo[5,4,0]undec-7-ene (DBU). Most preferably, the catalyst is a tertiary benzylic amine, such as N,N-dimethylbenzyl amine, N,N diethylbenzyl amine, and the like.

The catalyst is preferably used in an amount about 0.01 to 0.5 wt %, more preferably about 0.02 to 0.3 wt %, and most preferably about 0.03 to 0.1 wt %, based on the total weight of reactants.

The resin compositions of the invention preferably have an epoxy equivalent weight (EEW) of about 500 to about 5,000, more preferably from about 1,000 to about 4,000. The resin compositions preferably have a weight average molecular weight (Mw) of about 2,000 to about 20,000, more preferably from about 2,000 to about 15,000. The resin compositions preferably have a number average molecular weight (Mn) of about 1,000 to about 8,000, more preferably from about 2,000 to about 8,000.

The resin compositions of the invention preferably have an acid number (expressed in conventional units of mg KOH/g) of about 10 to about 75, more preferably from about 15 to about 55, and most preferably from about 15 to about 30.

The resin composition of the invention may be used as a coating composition. These coating compositions may include other additives and agents to provide formulations that can be applied to substrates such as, for example, metal containers. These materials may include additives such as carriers, emulsifiers, pigments, fillers, anti-migration aids, curing agents, coalescents, wetting agents, biocides, plasticizers, crosslinking agents, antifoaming agents, colorants, waxes, anti-oxidants, or combinations thereof. The coating composition may be applied to a substrate and subsequently baked to form a fully cured coating.

However, to reduce the amount of VOCs evolved during the baking step, in another embodiment of the invention the resin composition is mixed with water and a water-soluble base such as, for example, a tertiary amine, to form a water-based coating composition. Suitable water-soluble tertiary amines include, for example, dimethylamino ethanol. To form the water-based coating composition, sufficient water is preferably added to emulsify the resin composition and create a phase inversion with the water forming a continuous aqueous phase and the resin composition forming a discontinuous phase suspended within the aqueous phase. While the rheology of the emulsion depends on the hydrophobicity of the liquid organic medium, typically the particles of the resin composition are small particles preferably having an average particle size of less than about 0.5 micron, more preferably less than about 0.3 micron, and most preferably less than about 0.1 micron. The water based coating composition of the invention, which typically has a pH of about 6 to about 8, appears translucent, and has a shelf life of at least about 3 months to about 6 months and longer.

Suitable crosslinking agents that may be used in the coating compositions of the invention include, for example, amino resins, phenolic resins, blocked isocyanates, etc.

Some specific examples of suitable amino resins include fully or partially alkylated melamine-formaldehyde resins, benzoguanamine-formaldehyde resins, urea-formaldehyde resins, and Glycoluril-formaldehyde resins. More specifically, suitable crosslinkers include commercial materials available from Cytec industries under the trade designations Cymel 303, Cymel 325, Cymel 1123, Cymel 1125, Cymel 1156, Cymel 1170, Cymel 5010, Beetle 80, and Beetle 1054, and those available under the trade designation Mepranel MF-800 from Hoechst, etc.

Some specific examples of phenolic resins that may be used in the coating compositions of the invention include phenol-formaldehyde resins, cresole-formaldehyde, Bisphenol A- formaldehyde resins, and un-alkylated, partially-alkylated or fully-alkylated formaldehyde resins. Some more specific examples include those available from Oxychem under the trade designations Varcum 94-607, Varcum 29-116, Varcum 29-159, those available under the trade designations HRJ11206, HRJ2527 from Schenectady, those available under the trade designation EP 560 from Solutia, and those available under the trade designation Uravar FB210 from Schenectady. Blocked isocyanates can be aliphatic, cyclo-aliphatic, or aromatic poly-functional isocyanates, blocked with, for example, MEK-Oxime, epsilon-caprolactam, uretedione, alcohols, glycol ethers, etc. More specific examples include compounds available from Degussa under the trade designations Vestanat B1358, Vestanat B1370, Vestagon B 1530, and Vestagon BF 1540.

If desired, the coating composition of the present invention may optionally comprise an additional resin, such as a poly-hydroxy or phenoxy group containing resin. For example, epoxy or phenoxy resins having two or more hydroxy groups may be utilized. Typically, such resins will have epoxy or phenoxy end groups. The presently preferred epoxide equivalent weight (EEW) of such optional resins is greater than about 1,000. Examples of suitable such additional resins include those available from Shell under the trade designations EPON 1001, 1004, 1009 and those available under the trade designation DER 684 EK40 from Dow Chemical. In one embodiment the coating composition comprises (i) 20 to 100 parts by weight of the resin of formula 2; (ii) up to 80 parts by weight of a suitable additional resin having epoxy or phenoxy groups; and (iii) up to 20 parts of a suitable crosslinking agent.

The coating compositions of the invention may be applied to a substrate by any procedure known in the art, including spray coating, roll coating, and the like. Preferably, the coating is applied to a metal sheet or coil or the interior of a metal can using an airless spray. After application to a substrate, the coating composition is heated in a baking process to form a cured coating. During the bake, the ester acids react with the hydroxyl groups and the oxirane groups both inter-molecularly and/or intra-molecularly to form a crosslinked network bound together by ester linking groups.

The baking steps used to cure the coating compositions of the invention may occur in discrete or combined steps. For example, substrates can be dried at ambient temperature to leave the coating compositions in a largely un-crosslinked state. The coated substrates can then be heated to fully cure the compositions to provide a hard coating. More preferably, the coating compositions of the invention are dried and heated in one step.

The temperature used in the baking process preferably ranges from about 60° C. up to the decomposition temperature of the composition. Typically, baking at about 120° C. to about 400° C. for a period of time between about 3 seconds to about 15 minutes is sufficient to provide a fully cured composition, heat treatment at about 150° C. to 220° C. is preferred for about 1 minute to about 10 minutes.

The cured compositions of the present invention preferably have initial gloss values of at least about 90 when measured using a BYK Gardner micro gloss meter (catalog # 4520), and survive over 100 MEK Hammer rubs, when tested as described herein.

The cured coatings of the invention are particularly well suited as coatings for metal cans or containers. The containers may be coated with at least one layer of the cured coating, and the layers may be present on the inside of the containers, the outside of the containers, and the ends of the containers. The cured coatings adhere well to metal and provide substrates with high levels of resistance to corrosion or degradation that may be caused by food or beverage products.

The cured coatings also find excellent utility in the general packaging field, such as in the coating of aerosol cans. For example, the coating compositions of the present invention, in combination with a phenolic crosslinker and/or an amino resin, have successfully been tested inside a tin plated aerosol can. Such coatings have been found to provide outstanding resistance to dimethyl ether (DME) propellant in aerosol can applications. These coatings have also been found to be far superior to the presently commercially available coatings that are based on epoxy/phenolic crosslinker and/or amino crosslinker. They show, for example, improved flexibility, blush, and corrosion resistance. The also have the potential of reduced monomers/oligomers and reaction product migration into food.

EXAMPLES

The present invention is more particularly described in the following non-limiting examples that are intended for illustration purposes only, since numerous modifications and variations will be apparent to those skilled in the art. Unless stated otherwise, all parts and percentages are by weight.

Example 1

Preparation of Resin Composition

In a suitably equipped three neck flask, 250 g of EPON 2004 (Epoxy Equivalent Weight 928) was dissolved in 250 g of a glycol monoether acetate solvent available from Dow, Mich., MI under the trade designation Dowanol PM acetate at 90° C. To this solution at 90° C was added 15 g of trimellitic anhydride (TMA). The TMA dissolved rapidly. The batch temperature was decreased to 77° C., and 0.25 g of dimethylbenzylamine (DMBA) was added. The reaction temperature was maintained at 77° C. NMR was used to follow the progress of the anhydride reaction with the secondary hydroxy groups of the epoxy resin. After six hours more than 95% of the TMA had reacted. The resultant product had the characteristics listed in Table 1–6A below.

Example 2

Preparation of Resin Composition

The procedure of Example 1 was followed, and EPON 1007 (EEW=1852) was substituted for EPON 2004. After 8 hours, more than 95% of the TMA had reacted. The final product had the characteristics listed in Table 1–6A below.

Example 3

Preparation of Resin Composition

The procedure of Example 2 was followed, except the amount of DMBA was reduced to 0.130 g NMR was use to follow the progress of the reaction. After 14 hours, 93% of the TMA had reacted. The final product had the characteristics listed in Table 1–6A below.

Example 4

Preparation of Resin Composition

The procedure of example 1 was followed. Instead of EPON 2004, EPON 1001 (EEW=544) was used. The amount of TMA was 15 g After 8 hours, 98.7% of the TMA had reacted. The resulting product had the characteristics listed in Table 1–6A below.

Example 5A

Preparation of Resin Composition

In a suitably equipped three neck flask, 250 g of a "7 type" bisphenol A epoxy (EEW=1810) available under the trade designation KD 6817 from Kukdo Chemical Industry Co., Ltd, Seoul, Korea, was dissolved in 250 g of Dowanol PM acetate at 90° C. To this solution at 90° C. was added 12.5 g of trimellitic anhydride (TMA). The TMA dissolved rapidly. The batch temperature was decreased to 76° C., 0.08 g of dimethylbenzylamine was added. The reaction temperature was maintained at 75–77° C. NMR was used to follow the progress of the anhydride reaction with the secondary-OH of the epoxy resin. After 18 hours approximately 90% of the TMA had reacted. The final product had the characteristics listed in Table 1–6A below.

Example 5B

Preparation of Resin Composition

A similar reaction was carried out as in example 5A, except that 250 g of the epoxy resin KD 216 was used and the amount of TMA was 25.0 g. The resulting product characteristics are listed in Table 1–6A below.

Example 6A

Preparation of Resin Composition

A similar reaction was carried out as in example 5A, using a modified "7-type" epoxy resin (EEW=1540) available under the trade designation IF 666-1 from Ciba Geigy, Ardsley, N.Y. The resulting product had the characteristics listed in Table 6A below.

TABLE 1–6A

Properties of Resin compositions

| Example | Non-volatile material (NVM) (%) | Viscosity (Gardner Holt, 25° C.) | Acid Number | EEW | $M_w$ | $M_n$ |
|---|---|---|---|---|---|---|
| 1 | 51.8 | Z-Z1 | 32 | 1062 | 8320 | 2500 |
| 2 | 52.1 | Z5 | 32.6 | 2088 | 15970 | 4700 |
| 3 | 49.0 | Z4-Z5 | 31.3 | 2043 | 15000 | 4330 |
| 4 | 51.8 | U-V | 25.4 | 654 | 4800 | 1700 |
| 5A | 47.5 | Z1-Z2 | 27.7 | 1969 | 15031 | 5062 |
| 5B | 46.6 | N-R | 55 | 2004 | 15730 | 3120 |
| 6A | 45.6 | X-Y | 27.7 | 2111 | 15800 | 4607 |

Examples 6B–6D

Preparation of Resin Compositions

Resin compositions submitted for performance testing are summarized in Table 6B. The resin composition may be used as a coating composition or as a component of a coating composition. The resin compositions were prepared by dissolving an epoxy resin (available under the trade designation Araldite GT 9797 from Ciba Geigy) in Dowanol PM acetate and adding TMA. The catalyst used to facilitate the reaction was DMBA. The mixture was heated at 75° C. for 18 hours. The reaction was monitored using FTIR spectroscopy until over 90% the TMA had undergone reaction.

TABLE 6B–6D

| STARTING MATERIAL | Resin 6B (95% Epoxy/ 5% TMA) | Resin 6C (92.5% Epoxy/ 7.5% TMA) | Resin 6D (90% Epoxy/ 10% TMA) |
|---|---|---|---|
| Epoxy Resin | 48.8 | 48.0 | 46.9 |
| Dowanol PM Acetate | 48.8 | 48.0 | 47.9 |
| TMA | 2.4 | 4.0 | 5.2 |

Example 7

Preparation of Water Based Coating Composition

To a suitably equipped three-neck flask were charged 400 g EPON 1009, and 285 g methyl ethyl ketone (MEK). The blend was heated to 80° C. until all the epoxy resin was dissolved in MEK. To this solution was added 28 g TMA. After the TMA was dissolved, the temperature was reduced to 77° C., and 0.11 g of DMBA was added. The reaction mixture was maintained at 77° C. for 24 hours. NMR results indicated 91.5% of the TMA reacted. Approximately 100 g of MEK was removed at 65° C. under reduced pressure, followed by the addition of 93 g butyl cellosolve (BC) and 72 g n-Butanol. The batch was cooled to 50° C. A blend of 21.5 g dimethylethanolamine (DMEA) and 21.5 g deionized water were added over a period of 10 minutes, and held at 50° C. for 10 minutes. To this was added 925 g of water at 45–50° C. The resultant water based dispersion was translucent, indicating very small particle size. The final product characteristics are shown in Table 7A below.

TABLE 7A

| Example | NVM (%) | PH | Viscosity[1] (seconds) | Surface Tension (dynes/cm) | Number Avg. Particle Size (nm) | Weight Avg. Particle Size (nm) |
|---|---|---|---|---|---|---|
| 7 | 27 | 6.3 | 17 | 29 | 42 | 89 |

[1]Ford cup #4, measured at 25 degrees C.

Example 8

Preparation of Coating Compositions

The resin compositions of Examples 6B, 6C, and 6D were charged into separate stainless steel mixing vessels. To each were added Dapro U-99 and Kemira RDiS $TiO_2$ with low speed mixing. The mixtures were then mixed at high speed for 30 minutes, while keeping the temperature below 43° C. A grind of 6.5 was desired after the mixing stage. The $TiO_2$ dispersions were then passed through a water-cooled sand mill one time, to provide a desired grind of 7.5. Butyl cellosolve and Dowanol PM Acetate were then charged to each mill base. When the temperature of the mill base was below 35° C., a first coating composition 1 was made with Maprenel MF-800 (available from Hoechst) and a second coating composition 2 was made with Cymel 303 (available from Cytec Industries). Along with these components, Isophorone, and Slip Ayd SL 523 (available from Daniels Products) were added to each formulation. The components of the formulations are summarized in Tables 8A and 8B below.

TABLE 8A

Coating Formulation 1

| STARTING MATERIAL | WEIGHT % |
|---|---|
| Resin Composition of Ex. 6B, 6C, or 6D | 27.47 |
| Dowanol PM Acetate | 24.15 |
| Dapro U-99 | 0.16 |
| Kemira RDIS $TiO_2$ | 21.60 |
| Butyl Cellosolve | 9.91 |
| EB Acetate | 12.29 |
| Dowanol PM | 1.04 |
| Maprenal MF-800 | 0.48 |
| Isophorone | 0.09 |
| SL-523 | 2.81 |

TABLE 8B

Coating Formulation 2

| STARTING MATERIAL | WEIGHT % |
|---|---|
| Resin Composition of Ex. 6B, 6C, or 6D | 27.42 |
| Dowanol PM Acetate | 24.12 |
| Dapro U-99 | 0.22 |
| Kemira RDIS $TiO_2$ | 21.56 |
| Butyl Cellosolve | 9.81 |
| EB Acetate | 12.15 |
| Dowanol PM | 1.03 |
| Cymel 303 | 0.82 |
| Isophorone | 0.09 |
| SL-523 | 2.78 |

Example 9

Preparation of Control Coating Compositions

The butyl cellosolve, EB acetate (ethyl butyl acetate), Araldite GT 9797 (available from CIBA), Araldite GT 6099 (available from CIBA), and Hardner HT 3380-1 (available from CIBA) ingredients shown in the following table were charged into a stainless steel mixing vessel and held at 60–65° C. for 4 hours. The resin, now in solution form was then filtered through a 1 micron filter into a clean stainless steel mixing vessel. To this was added Dapro U-99 and Kemira RDiS $TiO_2$ with low speed mixing. The mixtures were then mixed at high speed for 30 minutes, while keeping the temperature below 43° C. A grind of 6.5 was desired after the mixing stage. The $TiO_2$ dispersions were then passed through a water-cooled sand mill one time, to provide a desired grind of 7.5. Butyl cellosolve and Dowanol PM Acetate were then charged to each mill base. When the temperature of the mill base was below 35° C., a coating composition was made with Maprenel MF-800 (available from Hoechst). Along with these components, Isophorone, and SL 523 slip aid (available from Daniels Products) were added to each formulation. The components of the formulations are summarized in Table 9A below.

TABLE 9A

Coating Formulation 1

| STARTING MATERIAL | WEIGHT % |
|---|---|
| Butyl Cellosolve | 11.03 |
| EB Acetate | 19.45 |
| CIBA Araldite GT 9797 | 12.61 |
| CIBA Araldite GT 6099 | 6.31 |

TABLE 9A-continued

Coating Formulation 1

| STARTING MATERIAL | WEIGHT % |
|---|---|
| CIBA HT-3380-1 | 2.22 |
| Dapro U-99 | 0.16 |
| Kemira RDIS $TiO_2$ | 21.60 |
| Butyl Cellosolve | 9.91 |
| EB Acetate | 12.29 |
| Dowanol PM | 1.04 |
| Maprenal MF-800 | 0.48 |
| Isophorone | 0.09 |
| SL-523 | 2.81 |

Example 10

Physical Properties of Dried Coating Formulations

Coating compositions were evaluated by applying the composition to a tin plated steel is (ETP) and baking at 193° C. for ten minutes. Gloss was measured using a BYK Gardner micro gloss meter (catalog #4520). MEK Hammer resistance was measured using a 0.9 kg hammer covered in cheesecloth soaked in MEK. The number of double rubs necessary to break through the coating was measured. In general, survival for 100 double rubs indicates a completely cured coating.

The physical properties of the dried coating composition are summarized in Table 10A.

TABLE 10A

Physical Properties of Dried Coating Formulations

| | Resin A | Resin B | Resin C | CONTROL |
|---|---|---|---|---|
| Bake (Min, 190° C.) | 10 | 10 | 10 | 10 |
| Coating Weight ($mg/cm^2$) | 1.2–1.6 | 1.2–1.6 | 1.2–1.6 | 1.2–1.6 |
| Flat Panel Evaluation | | | | |
| Gloss (60°0) | 90.7 | 98.6 | 96.4 | 95.8 |
| MEK Hammer Rubs | >100 | >100 | >100 | >100 |

Example 11

Solutions Used for Performance Testing of Coating Formulations

Processing Solutions were Prepared for the Performance Testing of the Coating Formulations According to the Weight Percents Summarized in Table 11A.

TABLE 11A

Solutions Used for Performance Testing of Coating Formulations

| TEST SOLUTION | CHARGE (g) |
|---|---|
| Cysteine (60 min, 128° C.) | |
| Deionized Water | 395.00 |
| Potassium Dihydrogen Phosphate | 1.56 |
| Di-Sodium Hydrogen Phosphate | 3.20 |
| Cysteine Monohydrate | 0.25 |

TABLE 11A-continued

Solutions Used for Performance
Testing of Coating Formulations

| TEST SOLUTION | CHARGE (g) |
|---|---|
| Lactic Acid (60 min, 128° C.) | |
| Deionized Water | 395.30 |
| 90% Lactic Acid | 4.70 |
| Cooking Salt/Acetic Acid (60 min. 12° C.) | |
| Deionized Water | 380.96 |
| NaCl | 7.60 |
| Concentrated Acetic Acid | 11.44 |
| O Solution (60 min, 121° C.) | |
| Deionized Water | 391.66 |
| Citric Acid | 7.84 |
| Ammonium Nitrate | 0.40 |
| $H_2O_2$ | 0.10 |
| R Solution (60 min, 121° C.) | |
| Deionized Water | 390.64 |
| Citric Acid | 7.80 |
| Ascorbic Acid | 1.56 |
| S Solution (60 min, 121° C.) | |
| Deionized Water | 360.38 |
| NaCl | 10.76 |
| Concentrated Acetic Acid | 17.92 |
| Gelatin | 10.76 |
| $Na_2S$ (10% in Water) | 0.18 |
| D Solution (60 min, 121° C.) | |
| Deionized Water | 100.00 |

The results of the solution tests are summarized in Table 11B.

TABLE 11B

Results of Solution Tests

| | Resin 6B | Resin 6C | Resin 6D | CONTROL |
|---|---|---|---|---|
| Cysteine | | | | |
| Adhesion | 10 | 10 | 10 | 10 |
| Stain | 7 | 7 | 7 | 7 |
| Corrosion | 10 | 10 | 10 | 10 |
| Lactic Acid | | | | |
| Adhesion | 8 | 9 | 10 | 8 |
| Corrosion | 7 | 7 | 8 | 7 |
| Cooking Salt/ Acetic Acid | | | | |
| Adhesion | 7 | 9 | 9 | 5 |
| Corrosion | 9 | 10 | 10 | 9 |
| O Solution | | | | |
| Adhesion | 9 | 10 | 9.5 | 9 |
| Corrosion | 9.6 | 10 | 10 | 8 |
| R Solution | | | | |
| Adhesion | 9 | 10 | 10 | 9 |
| Corrosion | 10 | 10 | 10 | 10 |
| S Solution | | | | |
| Adhesion | 10 | 10 | 10 | 10 |
| Corrosion | 10 | 10 | 10 | 10 |
| D Solution | | | | |
| Adhesion | 10 | 10 | 10 | 10 |
| Corrosion | 10 | 10 | 10 | 10 |

Example 12

Food Pack Protocols for Performance Testing of Coating Formulations

A 12-week food pack protocol was used to test the coatings. In this protocol a metal substrate was coated with the formulation containing the coating composition and was cured and fabricated into 202 ends and packed in triplicate. The media and process conditions that were employed included the following:

Group 1A: Brine, Chicken Broth, Lard, Dog Food with Liver, Salsa—Media runs were cold filled and then processed for 90 minutes at 120° C. The samples were then quenched with cold water and stored at 50° C. for 2 and 12 weeks, respectively.

Group 1B: Cream Style Corn—Media runs were cold filled and then processed for 60 minutes at 120° C. The samples were then quenched with cold water and stored at 50° C. for 2 and 12 weeks, respectively.

Group 2: Barbecue Sauce, Tomato Paste—Media runs were hot filled at 70–80° C. The samples were pasteurized for 25 minutes at 100° C. The samples were then quenched with cold water and stored at 50° C. for 2 and 12 weeks, respectively.

Group 3: Apple Juice—Media runs were hot filled at 90° C. The samples were then quenched with cold water and stored at 50° C. for 2 and 12 weeks, respectively.

Group 4: Frozen Okra, Spinach, Green Beans—Media runs cold filled in 2% NaCL solution and then processed for 60 minutes at 120° C. The samples were then quenched with cold water and stored at 50° C. for 2 and 12 weeks, respectively.

Group 5: Chili—Media runs were hot filled at 70–80° C. The samples were pasteurized for 25 minutes at 100° C. The samples were then quenched with cold water and stored at 25° C. for 4 weeks.

The results of the media runs are summarized in the following tables.

TABLE 12a

Results of 2 Week Food Pack Protocol Tests

| | Resin 6B | Resin 6C | Resin 6D | CONTROL |
|---|---|---|---|---|
| Chicken Broth | | | | |
| Adhesion | 10/10/10 | 10/10/10 | 10/10/10 | 9/9/9 |
| Stain | 7/8/7 | 8/7/8 | 9+/9/9 | 9/8/9 |
| Gloss | 10/10/10 | 10/10/10 | 10/10/10 | 10/10/10 |
| Lard | | | | |
| Adhesion | 10/10/10 | 10/10/10 | 10/10/10 | 10/10/10 |
| Dog Food | | | | |
| Adhesion | 10/10/10 | 9/9 | 10/10/10 | 9/9/9 |
| Stain | 7/7/7 | 8/8 | 7/8/7 | 8/9/9+ |
| Gloss | 10/10/10 | 10/10 | 10/10/10 | 10/10/10 |
| Brine | | | | |
| Adhesion | 10/10/10 | 10/10/9 | 10/10/10 | 10/10/10 |
| Corrosion | 9/10/9 | 10/10/10 | 10/10/10 | 7/8/9 |
| Gloss | 10/10/10 | 10/10/10 | 10/10/10 | 10/10/10 |
| Tomato Paste | | | | |
| Stain | 8/8/8 | 8/8/8 | 8/9/9 | 8/9/9 |
| Detinning/ Adhesion | 8/9/9 | 7/7/9 | 7/8/7 | 9/9/9 |
| Gloss | 10/10/10 | 10/10/10 | 10/10/10 | 10/10/10 |

TABLE 12a-continued

Results of 2 Week Food Pack Protocol Tests

|  | Resin 6B | Resin 6C | Resin 6D | CONTROL |
|---|---|---|---|---|
| Barbecue Sauce | | | | |
| Adhesion | 10/10/10 | 10/10/10 | 10/10/10 | 10/10/10 |
| Corrosion | 10/10/10 | 10/10/10 | 10/10/10 | 10/10/10 |
| Gloss | 10/10/10 | 10/10/10 | 10/10/10 | 10/10/10 |
| Apple Juice | | | | |
| Adhesion | 10/10/10 | 10/10/10 | 10/10/10 | 10/10/10 |
| Corrosion | 10/10/10 | 10/10/10 | 10/10/10 | 10/10/10 |
| Gloss | 10/10/10 | 10/10/10 | 10/10/10 | 10/10/10 |

Rating scale used: 0 to 10, where "0" is complete failure and "10" is no failure. Results are shown for three test pieces. For the Adhesion test a rating of "3" would indicate 30% of the coating remained adhered to the substrate, a rating of 7 would indicate 70% remained adhered, etc. For the Stain test a rating of "3" would indicate 30% of the coating was unstained, a rating of 7 would indicate 70% was unstained, etc. For the Corrosion test a rating of "3" would indicate 30% of the coating was un-corroded, a rating of 7 would indicate 70% remained un-corroded, etc. For the Gloss test a rating of "3" would indicate that the coating exhibited 30% of its original gloss value, a rating of "7" would indicate that the coating exhibited 70% of its original gloss value, etc.

TABLE 12B

Results of 12 Week Food Pack Protocol Tests

|  | Resin 6B | Resin 6C | Resin 6D | CONTROL |
|---|---|---|---|---|
| Chicken Broth | | | | |
| Adhesion | 10/10/10 | 10/10/10 | 10/10/10 | 9/10/9 |
| Stain | 8/8/8 | 7/7/7 | 8/8/9 | 8/7/6 |
| Gloss | 9/9/9 | 10/10/10 | 9/9/9 | 9/9/9 |
| Lard | | | | |
| Adhesion | 10/10/10 | 10/10/10 | 10/10/10 | 10/10/10 |
| Dog Food | | | | |
| Adhesion | 10/10/10 | 9/9 | 10/10/10 | 9/9/9 |
| Stain | 6/6/6 | 8/8/8 | 7/7/7 | 7/7/7 |
| Gloss | 10/10/10 | 10/10 | 10/10/10 | 10/10/10 |
| Brine | | | | |
| Adhesion | 10/10/10 | 10/10/4 | 10/10/10 | 10/10/10 |
| Corrosion | 9/10/9 | 9/8/5 | 10/10/9 | 10/9/8 |
| Gloss | 10/10/10 | 10/10/10 | 10/10/10 | 9/9/9 |
| Tomato Paste | | | | |
| Stain | 10/10/10 | 5/5/5 | 10/10/10 | 10/10/9 |
| Adhesion | 5/5/5 | 5/5/5 | 5/5/5 | 8/7/6 |
| Gloss | 10/10/10 | 10/10/10 | 10/10/10 | 10/10/10 |
| Barbecue Sauce | | | | |
| Adhesion | 10/10/10 | 9/9/10 | 10/10/10 | 10/10/9 |
| Corrosion | 9/10/10 | 10/10/10 | 9/10/9 | 9/9/8 |
| Gloss | 10/10/10 | 10/10/10 | 10/10/10 | 10/10/10 |
| Apple Juice | | | | |
| Adhesion | 10/10/10 | 10/10/10 | 10/10/10 | 10/10/10 |
| Corrosion | 10/10/10 | 10/10/10 | 10/10/10 | 10/10/10 |
| Gloss | 10/10/10 | 10/10/10 | 10/10/10 | 10/10/10 |
| Okra | | | | |
| Adhesion | 10/10/10 | — | 10/10/10 | 10/10/10 |
| Stain | 7/7/7 | — | 7/7/7 | 7/7/7 |
| Gloss | 10/10/10 | — | 10/10/10 | 10/10/10 |

TABLE 12B-continued

Results of 12 Week Food Pack Protocol Tests

|  | Resin 6B | Resin 6C | Resin 6D | CONTROL |
|---|---|---|---|---|
| Spinach | | | | |
| Adhesion | 10/10/10 | — | 10/10/10 | 10/10/10 |
| Stain | 6/6/6 | — | 6/6/6 | 6/6/6 |
| Gloss | 10/10/10 | — | 10/10/10 | 10/10/10 |
| Cream Corn | | | | |
| Adhesion | 10/10/10 | — | 10/10/10 | 10/10/10 |
| Stain | 8/8/8 | — | 8/8/8 | 8/8/8 |
| Gloss | 10/10/10 | — | 10/10/10 | 10/10/10 |
| Green Beans | | | | |
| Adhesion | 10/10/10 | — | 10/10/10 | 10/10/10 |
| Stain | 7/7/8 | — | 8/8/8 | 9/9/8 |
| Gloss | 10/10/10 | — | 10/10/10 | 10/10/10 |
| Salsa | | | | |
| Adhesion | 10/10/10 | — | 10/10/10 | 10/10/10 |
| Corrosion | 10/10/10 | — | 10/10/10 | 10/10/10 |
| Stain | 6/6/6 | — | 6/6/5 | 6/6/6 |
| Gloss | 10/10/10 | — | 10/10/10 | 10/10/10 |

The results of the four week chili pack test are summarized in Table 12C.

TABLE 12C

Results of 4 Week Chili Pack

|  | Resin 6B | Resin 6C | Resin 6D | CONTROL |
|---|---|---|---|---|
| Chili | | | | |
| Adhesion | 10/10/10 | — | 10/10/10 | 10/10/10 |
| Corrosion | 10/10/10 | — | 10/10/10 | 10/10/10 |
| Stain | 10/10/10 | — | 10/10/10 | 10/10/10 |
| Gloss | 10/10/10 | — | 10/10/10 | 10/10/10 |

Comparative Example 13

A coating composition was prepared by blending the following components: 27.5 parts of EPON 1009 epoxy resin, 13.6 parts of VARCUM 29-159, 0.9 parts of a 10% solution of a lubricant, 31.5 parts of methyl isobutyl ketone, 20.1 parts of DOWANOL PM, and 6.3 parts of DOWANOL PM Acetate.

Example 14

A coating composition was prepared by blending the following components: 68 parts of resin of example 5B, 2.5 parts of CYMEL 5010, 0.4 parts of lubricant, and 29.1 parts of Butyl Cellosolve Acetate.

Example 15

A coating composition was prepared by blending the following components: 64.4 parts of resin of example 5B, 2.6 parts of CYMEL 5010, 2.8 parts of URAVAR FB 210, 0.4 parts of lubricant, and 29.8 parts of Butyl Cellosolve Acetate.

The coating compositions of examples 13, 14, and 15 were applied on tin plated steel (ETP) at 204° C. for 10 minutes. The cured film weight was 0.45–0.62 mg/cm$^2$. The following table shows resistance properties at 49° C. for 30 days.

TABLE 13–15

| Item | DME/Isopropanol/Water (2/1/1) | | | DME/Isopropanol/Water (2/1/1 + 15% DEET) | | |
| --- | --- | --- | --- | --- | --- | --- |
| | Corrosion | Blush | Adhesion | Corrosion | Blush | Adhesion |
| Example 13 | 9.5 (L) 8 (V) | 3 (L) 5 (V) | 9 (L) 9 (V) | 9.5 (L) 8 (V) | 7 (L) 9 (V) | 9 (L) 10 (V) |
| Example 14 | 10 (L) 9.5 (V) | 10 (L) 10 (L) | 10 (L) 10 (V) | 10 (L) 9.5 (V) | 10 (L) 10 (V) | 10 (L) 10 (V) |
| Example 15 | 10 (L) 9 (V) | 10 (L) 10 (L) | 10 (L) 10 (V) | 10 (L) 9 (V) | 10 (L) 9 (V) | 10 (L) 10 (V) |

* Scale 1 to 10, where 10 is the best result.
(L) = Liquid phase
(V) = Vapor phase A number of embodiments of the invention have been described. Nevertheless, it will be understood that various modifications may be made without departing from the spirit and scope of the invention. Accordingly, other embodiments are within the scope of the following claims.

What is claimed is:

1. A resin composition, comprising:
a reaction product of an epoxy resin and an anhydride, the reaction conducted in the presence of a catalyst, wherein the resin composition's epoxide equivalent weight has not been significantly changed, compared to the unreacted epoxy resin, to an extent that would cause any undesirable gelling or crosslinking of the resin.

2. The composition of claim 1, wherein the reaction is conducted in an aprotic solvent.

3. The composition of claim 1, wherein the epoxy resin comprises a backbone having at least one pendant oxirane groups and at least one pendant hydroxyl functional group.

4. The composition of claim 3, wherein the epoxy resin comprises at least two hydroxyl functional groups.

5. The composition of claim 3, wherein the backbone is derived from a compound selected from the group consisting of bisphenol A, bisphenol F, biphenol, and resorcinol.

6. The composition of claim 5, wherein the compound is bisphenol A.

7. The composition of claim 1, wherein the anhydride is selected from the group consisting of phthalic anhydride, trimellitic anhydride, maleic anhydride, succinic anhydride, itaconic anhydride, and BTDA.

8. The composition of claim 1, wherein the catalyst is a tertiary amine.

9. The composition of claim 1, wherein the resin composition's epoxide equivalent weight is between about 1,000 to 4,000.

10. The composition of claim 1, wherein the resin composition has an acid number from about 15 to 55.

11. The coating composition of claim 1, further comprising an additional separate crosslinker.

12. The coating composition of claim 11, wherein the additional separate crosslinker is selected from the group consisting of an amino resin, a phenolic resin or a blocked isocyanate.

13. The coating composition of claim 1, wherein the composition comprises between 20 and 100 parts of the reaction product of an epoxy resin and an anhydride; (ii) up to 80 parts by weight of an additional resin having epoxy or phenoxy groups; and (iii) up to 20 parts of a suitable crosslinking agent.

14. A coating composition, comprising: the resin composition of claim 1, water and a base.

15. The coating composition of claim 14, wherein the composition comprises sufficient water to form a continuous aqueous phase and a discontinuous organic phase comprising the resin composition.

16. The coating composition of claim 15, wherein the discontinuous organic phase comprises particles of the resin composition with a particle size of less than about 0.5 micron.

17. The coating composition of claim 15, wherein the resin has an acid number from about 15 to 55 and the base comprises a tertiary amine and is present in an amount sufficient to neutralize from 20 to 100 percent of the acid.

18. A container, having: a coating applied to at least one surface thereof, wherein the coating comprises the resin of claim 1.

19. A container, having: a coating applied to at least one surface thereof, wherein the coating comprises the resin of claim 11.

20. A container, having: a coating applied to at least one surface thereof, wherein the coating comprises the resin of claim 14.

21. A method for making a resin composition, comprising:
providing an epoxy resin with a backbone having attached thereto at least one pendant oxirane group and at least one pendant hydroxyl group;
reacting the epoxy resin with an anhydride in an organic liquid medium to form a resin composition, wherein the resin composition has an epoxide equivalent weight that is substantially the same as the epoxide equivalent weight of the epoxy resin.

22. The method of claim 21, wherein the organic medium is an aprotic solvent.

23. The method of claim 21, wherein the epoxy resin and the anhydride are reacted at a temperature of less than about 125° C.

24. The method of claim 21, further comprising the step of:
adding water and a base, wherein sufficient water is added to form a coating composition comprising a continuous aqueous phase and a discontinuous organic phase comprising the resin composition.

25. The method of claim 24, wherein the discontinuous organic phase comprises particles of the resin composition with a particle size of less than about 0.5 micron.

26. The method of claim 21, further comprising the steps of:
applying the resin composition to a substrate and baking the resin composition.

27. The method of claim 21, wherein the epoxy resin is a reaction product of an epoxide and a dihydroxy compound.

28. The method of claim 27, wherein the dihydroxy compound is selected from the group consisting of bisphenol A, bisphenol F, biphenol and resorcinol.

29. A method for making a resin composition, comprising:
providing an epoxy resin with a backbone having attached thereto at least one pendant oxirane group and at least one pendant hydroxyl group; and
reacting the epoxy resin with an anhydride at a temperature of less than about 90° C., in an organic liquid medium to form a resin composition, wherein the resin composition has an epoxide equivalent weight that is substantially the same as the epoxide equivalent weight of the epoxy resin.

30. A method for making a resin composition, comprising:
providing an epoxy resin with a backbone having attached thereto at least one pendant oxirane group and at least one pendant hydroxyl group; and
reacting the epoxy resin with an anhydride in the presence of a catalyst, and in an organic liquid medium to form a resin composition, wherein the resin composition has an epoxide equivalent weight that is substantially the same as the epoxide equivalent weight of the epoxy resin.

31. The method according to claim 30, wherein the catalyst is a tertiary benzylic amine.

* * * * *